United States Patent Office 3,440,904
Patented Apr. 29, 1969

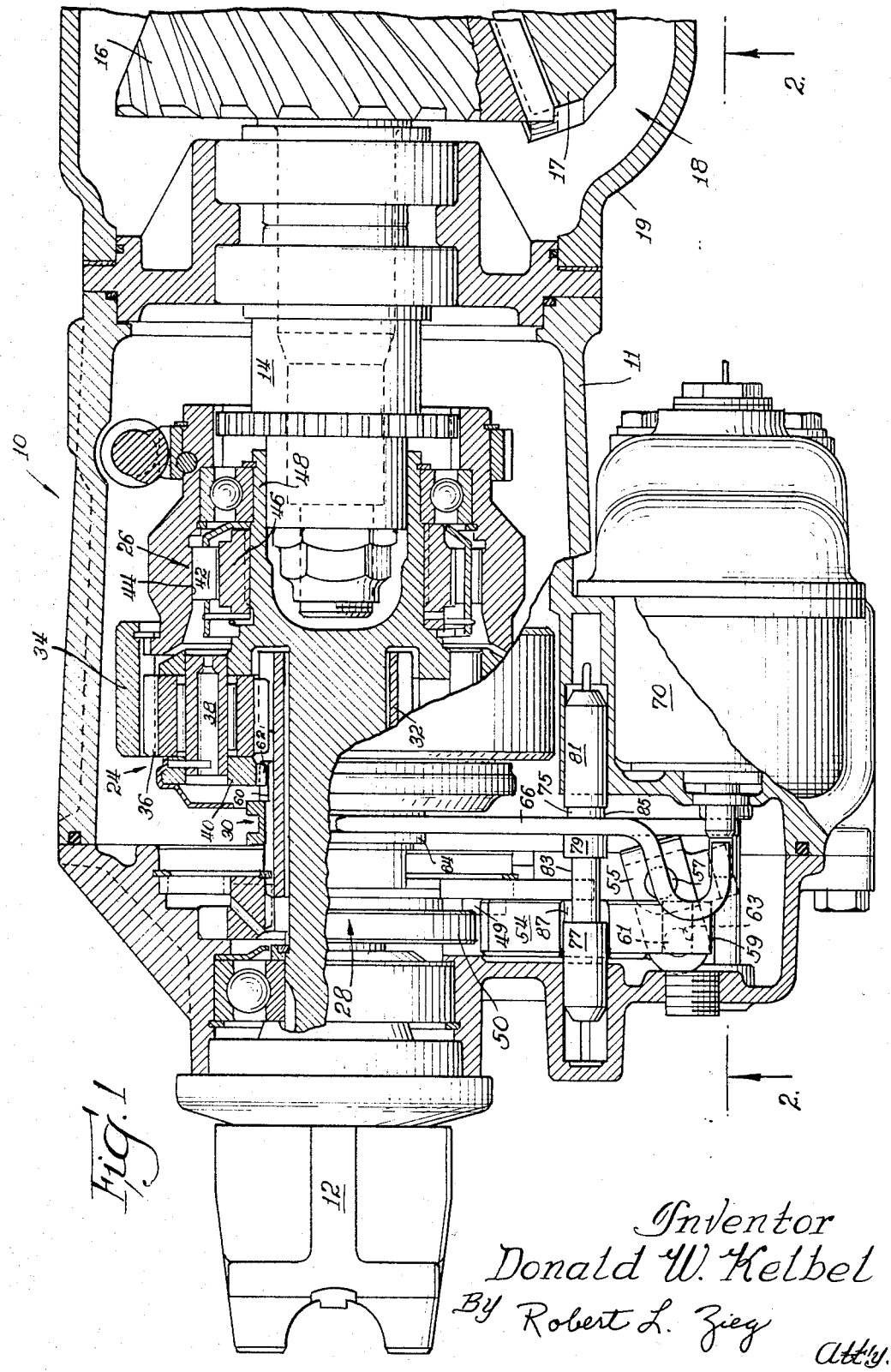

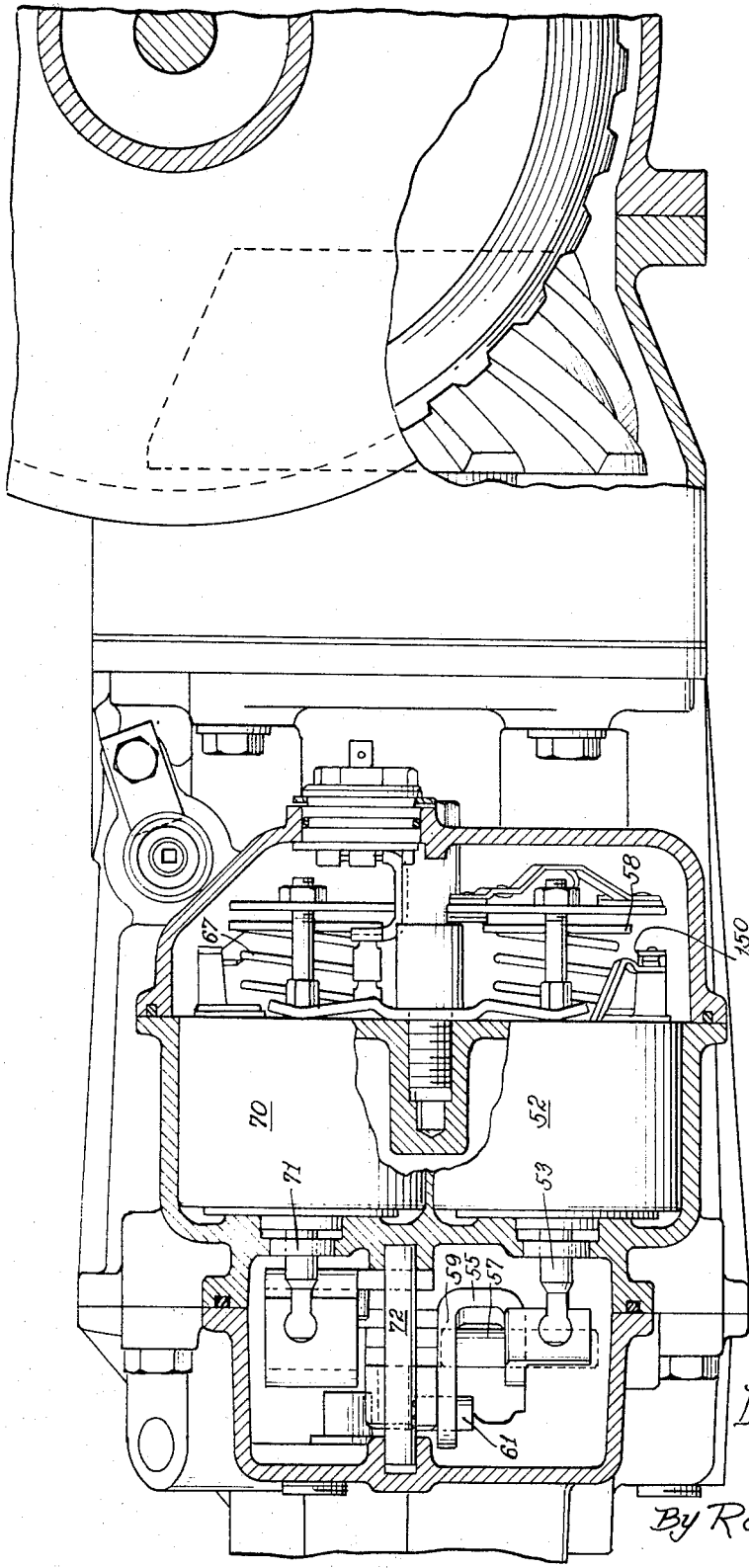

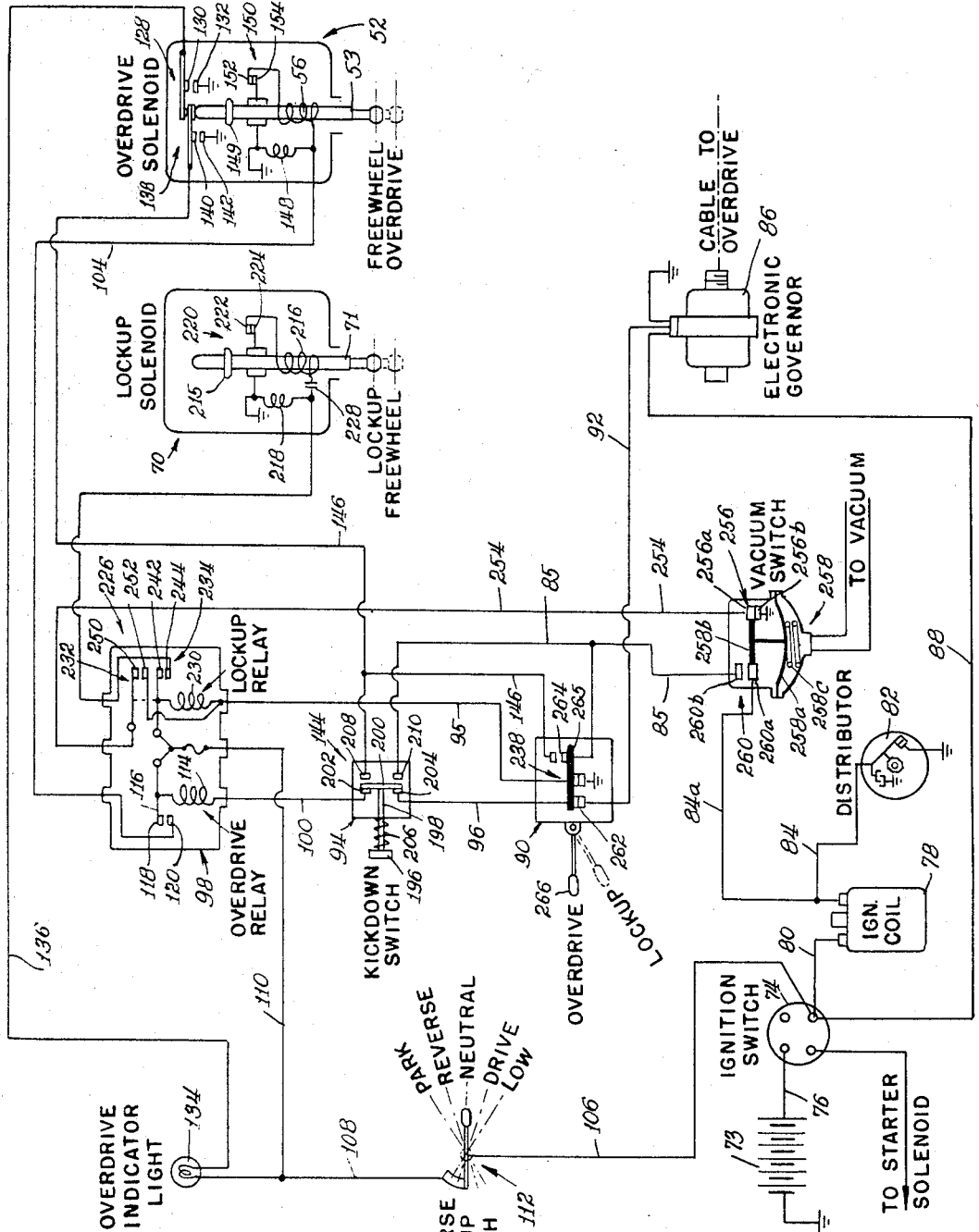

3,440,904
OVERDRIVE TRANSMISSION
Donald W. Kelbel, Muncie, Ind., assignor to Borg-Warner Corporation, Chicago, Ill., a corporation of Illinois
Filed Feb. 27, 1967, Ser. No. 618,934
Int. Cl. F16h 37/02
U.S. Cl. 74—781                    9 Claims

ABSTRACT OF THE DISCLOSURE

A vehicle transmission and differential mechanism including a remote control apparatus for an overdrive device mounted adjacent the differential mechanism. The control system provides for (1) selective change from lockup condition to overdrive condition and vice versa, (2) interruption of the vehicle engine ignition to facilitate change to the kickdown or lockup condition, (3) prevention of ignition interruption when the engine vacuum is high, and (4) prevention of a change from normal lockup condition to freewheel condition until the temperature of the transmission fluid reaches a predetermined level.

Summary of invention

The invention comprises an overdrive transmission mounted remote from the main vehicle transmission, and in the preferred embodiment illustrated the overdrive unit is mounted adjacent the differential unit. An improved electrical control system is provided for the overdrive unit. The control system includes a first solenoid for changing the overdrive unit between freewheel 1:1 ratio and overdrive ratio and a second solenoid operative to place the ovedrive unit in lockup 1:1 ratio condition or in condition allowing the first solenoid to establish the 1:1 freewheel or overdrive ratio. The control system includes means for interrupting the vehicle ignition to facilitate change from overdrive to 1:1 freewheel or lockup condition and means to preclude interruption of ignition under high engine vacuum condition.

Description of drawings

The invention consists of the novel constructions, arrangements and devices to be hereinafter described and claimed for carrying out the above stated objects and such other objects as will be apparent from the following description of a preferred embodiment of the invention, illustrated with reference to the accompanying drawings wherein:

FIGURE 1 is a sectional plan view of a combined transmission and differential mechanism of the present invention;

FIGURE 2 is an elevational sectional view, partly broken away, of the combined transmission and differential mechanism of FIGURE 1, and taken substantially on line 2—2 of that figure; and FIGURE 3 is a schematic view of a control system for the combined transmission and differential mechanism of the present invention.

Description of preferred embodiment

Referring now to the drawings and more particularly to FIGURE 1, the overdrive apparatus of the invention is indicated generally by the reference numeral 10 and includes an overdrive unit housing 11, an input shaft 12 and an output shaft 14 to which is secured a pinion gear 16 in mesh with a ring gear 17 which forms a part of the conventional differential unit 18. Mounted in the housing 19 adjacent the overdrive housing 11. The overdrive unit housing 11 includes a planetary gear set 24, a one-way clutch unit 26, a positive type brake 28 and a positive type clutch 30.

The present transmission selectively provides a direct drive or an overdrive between the shafts 12 and 14. The direct drive is afforded when the brake 28 and the clutch 30 are disengaged with the input shaft 12 rotating in the normal clockwise direction as viewed from the left in FIGURE 1. This drive is, of course, through the one-way clutch unit 26. A two-way direct drive between shafts 12 and 14 is provided when the clutch 30 is engaged so that the planetary gear set 24 is locked up and its constituent elements rotate together as a unit.

The planeary gear set 24 includes a sun gear 32, a ring gear 34, and a plurality of planet gears 36, each of which is mounted for rotation on a shaft 38. The shafts 38 are mounted in circumferentially spaced relation on a carrier 40 which is connected to the drive shaft 12. It will be noted that the sun gear 32 is rotatably disposed on the drive shaft 12, and that the ring gear 34 is drivingly connected to the drive shaft 14.

The one-way clutch unit 26 comprises a plurality of circumferentially spaced rollers 42 disposed between an internal cylindrical surface 44 forming a part of the output shaft 14 and the periphery of a collar 46 which is splined to a hub 48 forming a part of the input shaft 12. The outer periphery of the collar 46 is formed with a plurality of circumferentially spaced cam surfaces, one for each of the rollers 42. The rollers 42 tend to ride up on the cams when the unit is rotating in the normal direction, i.e., the clockwise direction, as viewed from the left in FIGURE 1, to provide a direct connection between the input shaft 12 and the output shaft 14. It will be appreciated that there is no driving connection between the input shaft 12 and the output shaft 14 when the input shaft 12 is rotated oppositely or when the speed of the output shaft 14, in the normal direction, exceeds the speed of the input shaft 12.

The brake 28 is similar to the overdrive brake described in the patent of Palmer Orr, 2,971,395, issued Feb. 14, 1961, which is assigned to the assignee of this application.

The brake 28 has for its purpose holding the sun gear 32 stationary to provide a reaction point for the planetary gear set 24 and includes an externally slotted blocker ring 49 which is freely rotatable and movable axially in frictional engagement with an externally slotted control ring 50. With reference also to FIGURE 3, the brake 28 is engaged by means of a solenoid 52 having a plunger 53 movable to the left as viewed in FIGURES 1 and 2 to rotate lever 55 in the clockwise direction, as viewed in FIGURE 1, about the axis of a pin 57. A spring 58 urges plunger 53 to the right as viewed in FIGURE 2. The lever 55 is of generally U-shaped configuration and has an angularly disposed section 59 provided with a pin 61 received in a slot 63 formed in a pawl 54. The pawl is moved radially inwardly upon energization of solenoid coil 52 for initial engagement of the blocker ring 49. Because of the frictional engagement between the blocker ring 49 and the control ring 50 and the torque reversal obtained when the throttle is released, the pawl 54 may be engaged with the slots of control ring 50 in a manner described in the aforementioned patent.

The clutch 30 has for its purpose the connection of the carrier 40 to the sun gear 32. This is accomplished by spring-biasing the sun gear axially to the right so that splines 60 of the sun gear are meshed with teeth 62 of the carrier. For this purpose, a shift collar 64 is mounted on the sun gear 32 and may be engaged by a shift fork 66. The clutch 30 is normally spring-biased into lockup position by means of a spring 67 and may be selectively disengaged as required by means hereinafter described.

Movement of the shift fork 66 is effected by means of a solenoid 70 having a plunger 71, which is selectively moved axially to the left, as viewed in FIGURES 1 and 2. Spring 67 biases plunger 71 to the right as viewed in FIGURE 2. The lower end of the shift fork 66 is bifurcated to surround a guide pin 72 in order to maintain the shift fork in the position illustrated in FIGURE 1. Inadvertent engagement of the brake 30 is precluded by an interlock pilot plunger 75 having lands 77, 79 and 81 defining grooves 83 and 85. Fork 66 is suitably connected to plunger 75 in the area of groove 85. When solenoid 70 is actuated, fork 66 moves plunger 75 so that the groove 83 is in register with the pawl 54 and permits movement of the pawl radially inwardly. In the position illustrated, land 77 lies within a recess 87 formed in one side of the pawl to preclude this movement. For a more detailed showing of the relationship between pawl 54 and the interlock plunger see FIGURE 2 of U.S. Patent 2,971,395 mentioned above.

By the above arrangement, the control functions of the remotely disposed overdrive unit may be electrically effected from the driver's seat and, as will be hereinafter apparent, the vehicle operator may select either an overdrive condition or a lockup condition and means are provided to preclude assumption of either of these conditions under certain circumstances as will be hereinafter apparent.

Referring to FIGURE 3, the control system of the present invention comprises an energy source 73, which preferably is a 12 volt direct current battery, an ignition switch 74 connected to the battery 73 by means of electric conductor 76, an ignition coil 78 connected to the ignition switch by means of conductor 80, a distributor 82 connected to the ignition coil by means of conductor 84, a governor 86 connected to the ignition switch by means of conductor 88, a lockup switch 90 connected to the governor by means of conductor 92, kickdown switch 94 connected to the lockup switch by means of conductor 96, and overdrive relay switch 98 connected to the kickdown switch by means of conductor 100. Kickdown switch 94 is also connected to the vacuum switch 258 and lockup switch 90 by conductor 85. Overdrive solenoid 52 is connected to the overdrive relay switch 98 by means of conductor 104. Ignition coil 78 is also connected to the vacuum switch by a conductor 84a. Electrical connection between the ignition switch 74 and the overdrive relay switch 98 is effected through conduits 106 and 108 and 110. Interposed between conduits 106 and 108 is a switch 112 which precludes operation of the solenoid 70 and 52 when the quadrant selector arm is in "PARK" or "REVERSE" positions thus assuring lockup in reverse.

The governor 86 precludes operation of the solenoid 52 unless the speed of the vehicle exceeds a predetermined value, e.g. 25 m.p.h. The governor 86 can be conveniently replaced in the present control system by a variable setting control working with the vehicle speedometer as for example disclosed in copending application S.N. 561,940, filed June 30, 1966 of common assignee. The governor 86 is illustrated as operating at a vehicle speed less than 25 m.p.h. and the positions of the several control elements reflect this situation. When the vehicle speed exceeds 25 m.p.h., governor 86 completes a circuit from ignition switch 74 through conductor 106, switch 112, conductor 110, coil 114, conductor 100, kickdown switch 94, conductor 96, switch 90, conductor 92 to ground. Coil 114 of overdrive relay 98 is thereby energized to pull armature 116 downwardly to effect engagement of contacts 118 and 120 with resultant energization of coil 56 of solenoid 52. When this occurs, the plunger 53 moves pawl 54 radially inwardly to effect overdrive in the manner above described. As the plunger 53 moves radially inwardly, normally open switch 128 is closed by engagement of contact 130 with contact 132 to energize indicator light 134 through conductor 136. At the same time, normally open switch 138 is closed by engagement of contacts 140 and 142 to condition normally open switch 144, forming a part of kickdown switch 94, for kickdown through the medium of conductor 146. When coil 56 is energized, holding coil 148 is also energized and normally closed switch 150 is opened by separation of contacts 152 and 154 by a ledge 149 on the plunger 53. When the plunger 53 moves downwardly (as outlined in FIGURE 3) ledge 149 moves to its lower limit position. Thereafter, the coil 56 is deenergized and the plunger 53 is maintained in overdrive position by means of the holding coil 148.

Vacuum switch 258 includes a diaphragm 258a having an insulated bar 258b connected thereto. A spring 258c urges diaphragm 258a and bar 258b up as viewed in FIGURE 3. Switch 258 includes switches 256 and 260. Switch 256 includes a contact 256a on bar 258b and a contact 256b connected to ground. Switch 260 includes a contact 260a on bar 258b and a contact 260b connected to conductor 85. The lower side of diaphragm 258 is subjected to engine vacuum so that under high vacuum conditions the insulated bar 258b will be in the position illustrated with switch 260 open and switch 256 closed.

Assuming now a vehicle speed of between 25 m.p.h. and approximately 65 m.p.h., the overdrive transmission of the invention may be selectively shifted to a direct drive ratio by operation of the floor mounted kickdown switch 94 which has an actuator 196, a shank 198 and a blade 200. The blade 200 normally engages contacts 202 and 204 to form a part of the circuit for energizing overdrive relay coil 114 as previously described. Disengagement is initiated by movement of the blade 200 to the right, against the force of a spring 206 to engage contacts 208 and 210 of switch 144. At this time the coil 114 is deenergized, contacts 118 and 120 are separated, holding coil 148 is deenergized and the plunger 53 is spring-urged by spring 58 to freewheel position. The present circuit includes an ignition interruption device so that torque through the driveline is temporarily interrupted whereby pawl 54 can be moved out of engagement with ring 50. When contacts 208 and 210 of kickdown switch 94 are electrically connected by blade 200, ignition coil 78 and distributor 82 are connected through conductor 84a, switch 260 in vacuum switch 258, conductor 85, contacts 208 and 210, conductor 146, and contacts 140 and 142 to ground whereby ignition is interrupted. As soon as plunger 53 is moved by spring 58, contacts 140 and 142 are separated and the ignition returned to operating condition.

As explained previously, the clutch 30 is normally spring-biased to lockup position by spring 67 and may be moved to freewheel position by actuation of solenoid motor 70 which includes the movable plunger 71, a main coil 216, a holding coil 218 and a switch 220 having contacts 222 and 224. The main coil 216 may be energized to move the clutch 30 to freewheel position upon energization of a lockup relay 226. The switch 220 is opened when the plunger 71 reaches freewheel position by means of a ridge 215 on plunger 71. Thereafter, the holding coil 218 retains the plunger 71 in freewheel position. To prevent operation of the solenoid 70 at temperatures below 50° F., a thermal switch is provided. The thermal switch 228 insures that the oil in the transmission unit will be warm so that the solenoids 70 and 52 can work properly.

Disengagement of the clutch 30 to condition the transmission for overdrive operation is afforded when the lockup relay 226 is energized. When the switch 90 is moved to the overdrive position the contacts of switch 238 are closed and coil 230 is energized for simultaneous engagement of switches 232 and 234, because of the ground provided by conduit 95 and switch 238 completing a circuit through conductors 106, 108, 110 and coil 230. When switch 234 closes engaging contacts 242 and 244, coils 216 and 218 are energized, providing thermal switch 228 is operative. Coil 216 thus moves plunger 71 down as viewed in FIGURE 3 against the force of spring 67 to disengage lockup clutch 30. Coil 216 is deenergized when switch 220 is opened, as explained above.

Closing of normally open switch 232, by engagement of contacts 250 and 252, energizes conduit 254 providing normally open switch 256, forming a part of vacuum switch 258, is in the closed position illustrated. This is a high vacuum condition which accompanies the closed throttle position, such as when the vehicle is coasting. When switch 256 is closed under high vacuum conditions a circuit through coil 230 and conductor 254 is completed which is parallel to the circuit through coil 230, conductor 95 and switch 238. Thus even if manual switch 30 is moved to the "lockup" position opening switch 238, coil 230 will remain energized thereby preventing a shift to "lockup" under high vacuum conditions.

The switch 260 in vacuum switch 258 is normally closed and is opened under high vacuum conditions illustrated. Switch 250 when open disables the kickdown switch 94 to prevent inadvertent kickdown under high vacuum conditions.

Lockup switch 90 also includes switch 262 and switch 264. These switches are mechanically connected by insulated bar 265 so that upon movement of the lever 266 to the lockup position illustrated in dotted lines, switch 262 is opened, switch 238 is opened, and switch 264 is closed. The opening of switch 262 effects deenergization of main coil 56 of solenoid motor 52 by deenergization of coil 114 and subsequent opening of contacts 118 and 120. Opening of switch 238 deenergizes conduit 95 thus deenergizing coil 230 unless there is a high vacuum condition. In that event, the lockup circuit is completed by closing of the switch 256. When the engine vacuum returns to a low value, switch 256 opens thus deenergizing coil 230 and opening switches 232 and 234 with the result that coil 218 is deenergized and spring 67 returns plunger 71 to lockup position. Switch 264 parallels switch 144 thus providing for manual interruption of ignition as described above with regard to the kickdown operation to allow for return of plunger 53 of solenoid 52 to the freewheel position, except when switch 260 is in the open position (under high vacuum conditions) as illustrated.

The overdrive unit of the present invention exhibits important advantages over overdrive units heretofore known. For instance, the present unit is disposed remotely from the engine and thus permits a lower transmission tunnel and a silhouette. The controls system of the invention provides for selective operation of the unit in either overdrive or lockup position. Also, the present control system permits a kickdown from overdrive to direct drive under normal conditions of operation within a median speed range and prevents such change in condition when the engine vacuum is high, such as when the vehicle is coasting. The overdrive lockup switch may be manually moved to lockup position and such lockup will be effected except when the engine vacuum is high. A thermal switch is included to insure that shifting out of lockup is prevented until the transmission oil is warm. Further, the present control system provides for easy selection of overdrive operation when desired by the operator of the vehicle assuming vehicle speed and engine vacuum are at proper levels, by use of a solenoid to shift out of lockup condition as opposed to known overdrive systems wherein a manual linkage system is utilized. Also, the solenoids utilized are conveniently mounted on the side of the transmission to provide adequate road clearance for the vehicle.

Further, by use of a solenoid rather than a manual shift rail to provide for lockup or freewheel condition, remote mounting of the overdrive unit is possible since only electrical connections to the operating controls is required. Therefore the present overdrive unit can be mounted any place in a vehicle drive line between the transmission and the rear axle although in the preferred embodiment illustrated the overdrive unit is mounted adjacent the vehicle rear axle.

I claim:

1. An overdrive transmission mechanism for an automotive vehicle in which the overdrive transmission is mounted remotely from the vehicle transmission comprising a planetary gear set having an input shaft and an output shaft, a positive clutch operatively associated with said planetary gear set and adapted to establish a 1:1 drive ratio therethrough when engaged, a positive brake operatively associated with said planetary gear set and adapted to establish an overdrive ratio through said planetary gear set when engaged, a one-way clutch operatively associated with said planetary gear set and adapted to establish a one-way 1:1 drive ratio through said planetary gear set when both said brake and clutch are disengaged, control means for said planetary gear set including a manual switch for selectively engaging said clutch or conditioning said planetary gear set for engagement of said brake or said one-way clutch, an overdrive solenoid in said control means energizable to engage said brake, a lockup solenoid in said control means engageable to disengage said clutch, said control means including a kickdown switch connected to said overdrive solenoid and actuatable to deenergize said solenoid, said manual switch being actuatable to deenergize said lockup solenoid to engage said clutch and establish a two-way 1:1 drive ratio through said planetary gear set at the will of the operator of the vehicle.

2. A combination overdrive transmission and differential assembly for an automotive vehicle in which the overdrive transmission is adapted to be directly connected to the differential assembly comprising a planetary gear set having an input shaft and an output shaft, the output shaft being drivingly connected to the driving pinion gear of the differential, a positive clutch operatively associated with said planetary gear set and adapted to establish a 1:1 drive ratio therethrough when engaged, a positive brake operatively associated with said planetary gear set and adapted to establish an overdrive ratio through said planetary gear set when engaged, a one-way clutch operatively associated with said planetary gear set and adapted to establish a one-way 1:1 drive ratio through said planetary gear set when both said brake and clutch are disengaged, control means for said planetary gear set including a manual switch for selectively engaging said clutch or conditioning said planetary gear set for engagement of said brake or said one-way clutch, an overdrive solenoid in said control means energizable to engage said brake, a lockup solenoid in said control means energizable to disengage said clutch, said control means including a kickdown switch connected to said overdrive solenoid and actuatable to deenergize said solenoid, said manual switch being actuatable to deenergize said lockup solenoid to engage said clutch and establish a two-way 1:1 drive ratio through said planetary gear set at the will of the operator of the vehicle.

3. An assembly in accordance with claim 1 wherein means are provided for preventing deenergization of said lockup solenoid under high vacuum conditions.

4. An assembly in accordance with claim 1 wherein said lockup solenoid is provided with a thermal switch to preclude disengagement of said clutch means until the temperature of the transmision unit lubricant fluid reaches a predetermined value.

5. An assembly in accordance with claim 1 wherein said lockup solenoid is provided with a main coil energizable to disengage said clutch and wherein a holding coil is provided to prevent reengagement of said clutch until the occurrence of predetermined events.

6. An assembly in accordance with claim 1 wherein means are provided for interrupting the vehicle engine ignition to allow disengagement of said brake and including means preventing interruption of the vehicle ignition circuit under high vacuum conditions.

7. A combined overdrive and differential assembly for an automotive vehicle comprising a housing, an overdrive transmission unit mounted in said housing, a differential unit mounted in a housing adjacent said overdrive housing, said overdrive transmission unit having an input shaft and an output shaft connected to said differential unit, said overdrive transmission unit including a planetary gear set interposed between said input shaft and said output shaft, said planetary gear set including a plurality of intermeshed gear elements, a one-way clutch engageable to afford direct drive through said gear set in one direction of rotation of said input shaft, a brake means for holding an element of said gear set to afford an overdrive of said output shaft, clutch means engageable to positively connect two elements of said gear set to afford a direct drive in either direction of said output shaft, an overdrive solenoid operable upon energization to engage said brake, said overdrive solenoid mounted adjacent said housing on an axis parallel to said shafts, linkage means interconnecting said overdrive solenoid motor and said brake, a lockup solenoid motor mounted adjacent said housing on an axis parallel to said shafts and operable upon energization to disengage said clutch, the parallel mounting of said solenoid motors providing adequate ground clearance for the vehicle, a control means for said solenoid motors including a manual switch, said manual switch being actuatable to deenergize said lockup solenoid motor to engage said clutch and establish a two-way 1:1 drive ratio through said planetary gear set at the will of the operator of the vehicle.

8. A combined overdrive and differential assembly in accordance with claim 7 including spring means adapted to urge said clutch into engagement and spring means adapted to disengage said brake when said overdrive solenoid is deenergized.

9. An overdrive transmission assembly for an automotive vehicle adapted to be mounted remotely from the vehicle transmission, said overdrive transmission unit having an input shaft and an output shaft, said overdrive transmission unit including a planetary gear set interposed between said input shaft and said output shaft, said planetary gear set including a plurality of intermeshed gear elements, a one-way clutch engageable to afford direct drive through said gear set in one direction of rotation of said input shaft, a brake means for holding an element of said gear set to afford an overdrive of said output shaft, clutch means engageable to positively connect two elements of said gear to afford a direct drive in either direction of said output shaft, an overdrive solenoid operable upon energization to engage said brake, and a lockup solenoid operable upon energization to disengage said clutch, a control means for said solenoid including a manual switch, said manual switch being actuatable to deenergize said lockup solenoid to engage said clutch and establish a two-way 1:1 drive ratio through said planetary gear set at the will of the operator of the vehicle.

References Cited

UNITED STATES PATENTS

| 2,380,717 | 7/1945 | Beltz | 74—781 |
| 2,936,648 | 5/1960 | Barnes | 74—781 XR |
| 2,971,395 | 2/1961 | Orr | 74—781 XR |
| 3,126,765 | 3/1964 | Conkle | 74—781 |

CARLTON R. CROYLE, Primary Examiner.

A. D. HERRMANN, Assistant Examiner.

U.S. Cl. X.R.

74—852, 866